J. COYNE.
Apparatus for Separating Breeze from Ashes.
No. 201,390. Patented March 19, 1878.
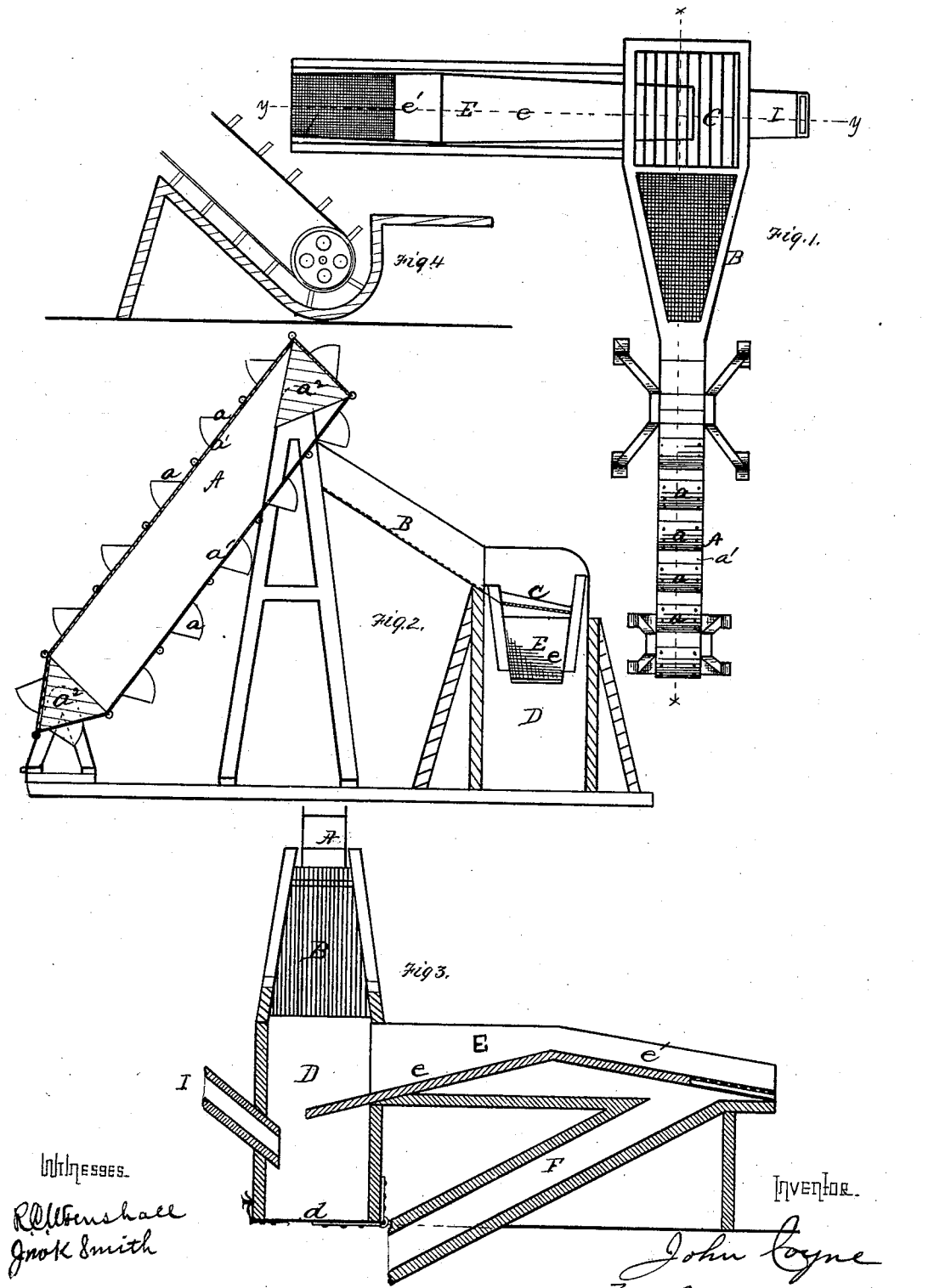

UNITED STATES PATENT OFFICE.

JOHN COYNE, OF PITTSBURG, PENNSYLVANIA.

IMPROVEMENT IN APPARATUS FOR SEPARATING BREEZE FROM ASHES.

Specification forming part of Letters Patent No. 201,390, dated March 19, 1878; application filed November 17, 1877.

*To all whom it may concern:*

Be it known that I, JOHN COYNE, of the city of Pittsburg, in the county of Allegheny and State of Pennsylvania, have invented a new and useful Improvement in Breeze-Separators; and I do hereby declare the following to be a full, clear, and exact description thereof, reference being had to the accompanying drawings, forming part of this specification, in which—

Figure 1 is a plan view of devices embodying my invention. Fig. 2 is a vertical section on the line $x\ x$, Fig. 1. Fig. 3 is a vertical section in the line $y\ y$, Fig. 1; and Fig. 4 is a diagram illustrating devices which may be employed to remove the small clinkers from the tank.

Like letters refer to like parts wherever they occur.

My invention relates to the construction of separators adapted to the recovery of breeze or small cokes from the ashes and clinkers of bituminous and other coals; and consists, first, in the combination of a riddle or sieve for removing the fine ash, an inclined sieve or riddle for separating the breeze and small clinkers, and a water-tank arranged beneath the breeze-riddle, for separating the breeze and small clinkers; secondly, in the combination, with a riddle for separating the breeze and fine clinkers from the large clinkers, of a water-tank with an overflow-race, for conducting off the breeze and water, and a water-inlet arranged lower than the overflow, to cause an agitation of the contents of the tank; thirdly, in combining, with the riddle and its tank, a double-inclined perforated race, and return-conduit, for delivering the breeze and returning the water to a reservoir, from whence it may be drawn for further use, or for conducting off the waste-water at will; finally, in details of construction hereinafter more specifically set forth.

In and about large manufactories where coal, especially bituminous coal, is employed, much waste occurs annually from the fine coke or breeze and like unconsumed fuel, which remains mixed with the ash and clinkers, being carted off and thrown in the rivers, whence it is carried by the current into the channels, and tends to fill the same and obstruct navigation. The breeze thus lost is of much value for blacksmiths' use, and is superior to coal or the regular coke where a compact, intense, clear, and smokeless flame is required. The present method of recovering the breeze is to dump the load of ash and clinkers into a hogshead or tank of water, and to fish out with a hand-riddle so much of the breeze or fine coke as floats; but, as much is carried down by the clinkers and ash, at least seventy-five per cent. is lost, and what is recovered scarcely pays for the time and labor involved.

The object of the present invention is, therefore, to provide means for expeditiously, effectually, and cheaply recovering breeze or fine coke from the ashes and clinkers of manufactories, &c.

I will now proceed to describe my invention, so that others skilled in the art to which it appertains may apply the same.

A represents an elevator, consisting of buckets $a$, secured to a suitable belt or chain, $a^1$, the chain being preferably hoop-iron, double-linked, and fastened to each side of the bucket, the whole actuated by pulleys $a^2$, triangular or other shaped, as preferred. This elevator serves to carry the ashes to an elevated inclined sieve, screen, or riddle, B, of such mesh as will permit the escape of fine ashes only.

C is a larger riddle, of such mesh as will permit the passage of all breeze or fine coke and small clinkers, and arranged at such an angle as will deflect all the large clinkers which cannot pass the mesh. Beneath the riddle C is arranged a water-tank, D, provided with an overflow chute or race, E, at a lower point than the riddle, and a water-inlet, I, at a point somewhat lower than the overflow. This arrangement of the inlet causes a rising current in the tank, which serves to agitate and separate the breeze and clinker which may pass the mesh of riddle C. The bottom of water-tank D is provided with a drop or sliding bottom, $d$, for the removal of refuse from the tank; but, if preferred, an elevator, such as is shown in Fig. 4, may be constructed for the purpose.

E indicates a race or chute for the discharge of the water and breeze from tank D. It is composed of two inclines, $e\ e'$, the one, $e$, rising from the tank, so that the overflow is higher than the race at its junction with the tank, and the other, $e'$, declining from the point of overflow, so as to deliver the breeze floated out. The incline e' is provided with a grating or perforated bottom, through which the overflow-water sinks into and is carried off by a pipe or conduit, F. The pipe or conduit F may deliver the waste-water into a reservoir, from whence it can be pumped to the tank and reused; or the water may be allowed to waste, as preferred.

The operation of my devices is as follows: The ashes, clinkers, &c., having been dumped upon an incline, which delivers them to the elevator, (or being otherwise placed within the sweep of its buckets,) are lifted thereby and deposited on screen or riddle B, through which the dust and fine ashes fall, accumulating in a pile beneath the screen, whence they can be carted off at will. The clinkers, breeze, &c., pass from riddle B upon the inclined riddle C, which deflects the larger clinkers, delivering them in a pile on one side of the tank, whence they are removed. The breeze or fine coke and small clinkers fall through the riddle into the water-tank, where they are washed and agitated by the current of flowing water, the clinkers falling to the bottom and being removed, as before specified, while the lighter breeze is carried by the current into the race E, past the overflow, and down incline e', which delivers it to a proper receptacle, the water being conducted off by conduit F.

Where it is convenient, an inclined canal may be made from beneath the bottom of the washing-tank, along which the waste-water from the apparatus would carry the refuse. The water for supplying the tank may be obtained from any suitable source. An elevated reservoir may be used, and the water pumped back and reused, or the waste-water from rolling-mills be employed, when the apparatus is used to separate the breeze in such mills.

The power required may be obtained from the usual power of the works where the apparatus is employed, or may be specially provided, as circumstances dictate.

The advantages of my invention are simplicity and effectiveness, as well as saving in labor, and the increase of quantity of breeze obtained from the ash, &c. All the ashes produced in any mill in the country may have the coke separated therefrom by a single machine operated by a man and a boy, while by the present methods ten men would be required to do the same amount of work.

Having thus described my invention, I claim and desire to secure by Letters Patent—

1. In a machine for recovering breeze, and for like purposes, the combination of an inclined screen or riddle for separating the ash and dust, an inclined riddle for separating the breeze and fine clinkers, and a tank arranged beneath the riddle, and supplied with a current of water for separating the breeze from the fine clinkers, substantially as specified.

2. The combination, with a riddle for separating breeze from clinkers, &c., of a tank arranged beneath the riddle, a double-inclined race or chute for delivering the breeze and overflow-water, and a water-inlet arranged in the tank somewhat lower than the overflow or highest part of the race, substantially as and for the purpose specified.

3. In combination with the water-tank and its riddle C, the race having the perforated bottom and return-conduit, substantially as and for the purpose specified.

In testimony whereof I, the said JOHN COYNE, of Pittsburg, county and State aforesaid, have hereunto set my hand.

JOHN COYNE.

Witnesses:
  JAMES I. KAY,
  JNO. K. SMITH.